United States Patent [19]

Catanzarite

[11] 3,773,351
[45] Nov. 20, 1973

[54] GAS GENERATOR

[75] Inventor: Vincent O. Catanzarite, Las Vegas, Nev.

[73] Assignee: Hubert G. Timmerman, Manhattan Beach; Louis Giattino, Palos Verdes Peninsula, both of Calif.; Joseph Calabria, Brecksville, Ohio; Robert Lynch, Greenleaf Fountain Valley, and Michele Gallo, Upland, both of Calif., a part interest to each

[22] Filed: Aug. 2, 1971

[21] Appl. No.: 167,944

[52] U.S. Cl. .............. 280/150 AB, 23/281, 102/39, 222/3
[51] Int. Cl. ............................................. B60r 21/08
[58] Field of Search ............... 280/150 AB; 23/281; 102/39

[56] References Cited
UNITED STATES PATENTS

| | | | |
|---|---|---|---|
| 3,618,981 | 11/1971 | Leising et al. | 102/39 |
| 3,666,289 | 5/1972 | Magyar | 280/150 AB |
| 3,624,810 | 11/1971 | Hass | 280/150 AB |
| 3,532,360 | 10/1970 | Leising et al. | 23/281 X |
| 3,655,217 | 4/1972 | Johnson | 280/150 AB |
| 3,393,639 | 7/1968 | Bolieau et al. | 102/39 X |
| 3,527,472 | 9/1970 | Chute et al. | 280/150 AB |
| 3,642,304 | 2/1972 | Johnson et al. | 280/150 AB |

Primary Examiner—Kenneth H. Betts
Assistant Examiner—John P. Silverstrim
Attorney—Richard D. Seibel et al.

[57] ABSTRACT

A low temperature gas generator for inflation of gas bags, particularly useful for passenger restraint in an automobile is provided. An oxidation-reduction pyrotechnic gas producing mixture is hermetically sealed in a chamber prior to initiation, and is ignited by a bridge wire initiator. The pyrotechnic mixture produces a gas comprising principally carbon dioxide and water vapor. Vaporized salts may also be present. These hot gases flow through an array of wires for sound muffling and flame arresting, through a relatively unobstructed passage to a relatively large outlet and into a gas bag for inflation in a very short time interval. Means are provided for inhibiting gas flow rates to less than sonic velocity. Subsequent deflation of the bag occurs upon condensation of water vapor and contraction of carbon dioxide.

If desired an aspirator may draw ambient air into the bag with the combustion gases, and when used the aspirator permits reverse flow, giving additional means for deflating the bag. Means are provided for controlling the rate of gas generation and gas temperature for controlled bag deployment and pressurization. A piezoelectric device is provided for firing the bridge wire initiator.

11 Claims, 13 Drawing Figures

PATENTED NOV 20 1973 3,773,351

INVENTOR.
VINCENT O. CATANZARITE
BY
Christie, Parker & Hale
ATTORNEYS

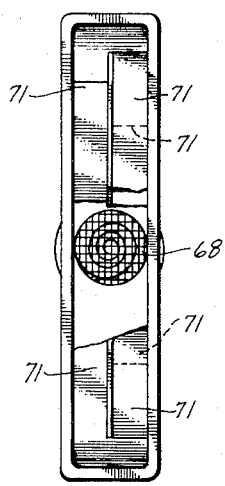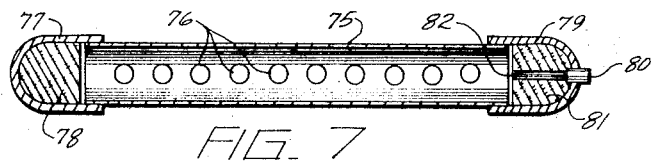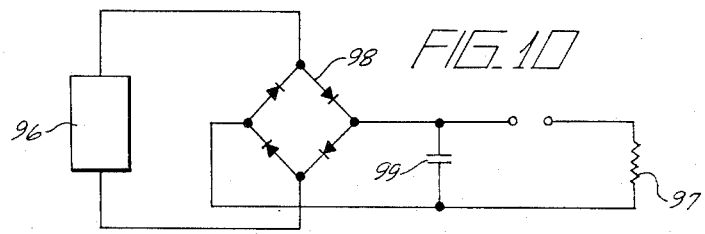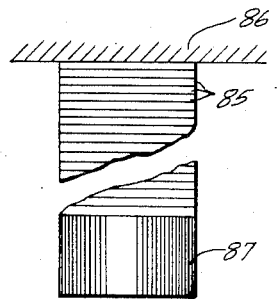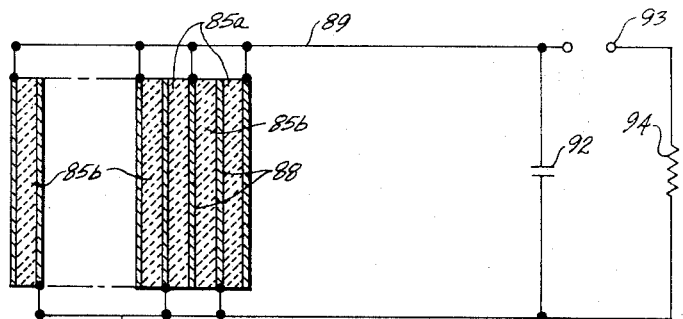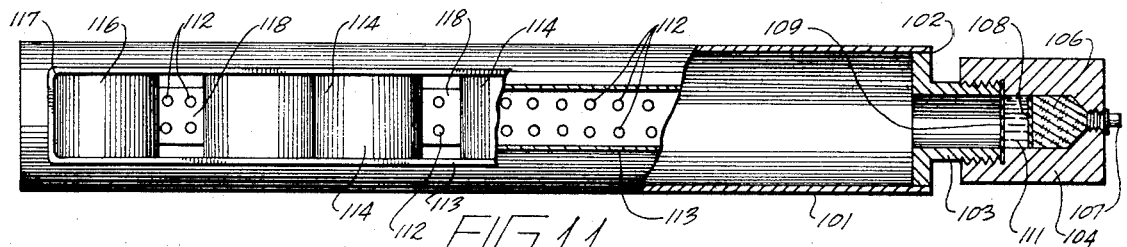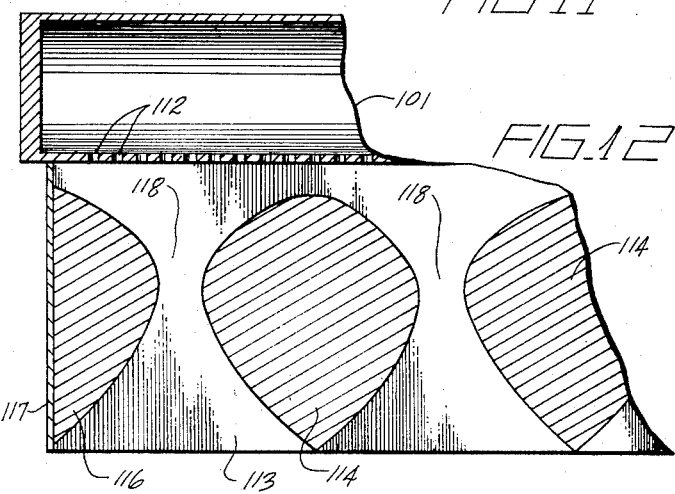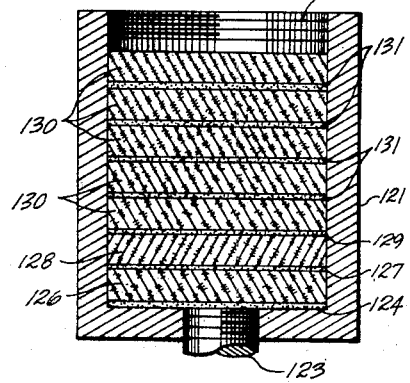

GAS GENERATOR

BACKGROUND

This application is related to copending U.S. patent application Ser. No. 167,943 entitled "Method and Product for Gas Generator" by Hubert G. Timmerman and Vincent Catazarite and assigned to Specialty Products Development Corporation, assignee of this application. The teachings of the aforementioned patent application are hereby incorporated by reference for full force and effect as if set forth in full herein.

Since large numbers of people are killed or maimed annually in automobile accidents wherein the passengers are thrown forwardly in the vehicle there has been considerable impetus toward development of passenger restrain systems. One system extensively investigated senses rapid deceleration of the vehicle such as occurs upon impact and initiates inflation of a bag between, for example, the automobile dashboard and the front seat occupant. Inflation of the bag occurs within milliseconds of the initiation of the impact in order to restrain the occupant before he can be thrown against solid portions of the vehicle. As soon as the first impact of a crash is completed it is desirable to deflate the bag so that the occupant is not trapped in the vehicle by an inflated bag. It is also desirable to deflate the bag rapidly so that in case of accidental inflation the restraint upon the person driving the automobile is sufficiently short that he does not lose control of the vehicle. In order to meet such criteria specifications have been established whereby a bag may be inflated sufficiently to restrain a passenger in about 20–25 milliseconds after initiation and substantial deflation may be required after about 100 milliseconds.

A proposed technique for inflating an air bag or the like for restraining a passenger is to provide a reservoir of gas at very high pressure so that the gas can be discharged into the bag as soon as an impact is sensed. In order to obtain a sufficient volume of gas (approximately 10 cubic feet) for inflating a passenger restraint bag a relatively large reservoir of gas at pressures of 3000 psi or more is required. To open the gas reservoir in the very short time intervals required for providing passenger safety, explosive arrangements have been employed for bursting a diaphragm or cutting through a structural portion of the reservoir to release the gas. Such explosive arrangements have significant safety problems inherent in them such as shrapnel as well as the inherent relatively high sound level of an explosion. The psychological factor of having high explosives in each automobile cannot be ignored.

The gas bottle technique for inflating an air bag suffers from an additional disadvantage in that the pressure is maximum at the commencement of deployment of the bag and decreases as a function of time as the gas in the storage reservoir is depleted. The pressure/time history of pressurized gas inflation techniques is difficult if not impossible to control at reasonable cost and reliability. The pressurized gas technique is undesible since a minor leak can result in all of the gas being discharged during the long period that the passenger restrain system must remain in the automobile prior to any crash. The pressurized gas technique also results in substantial cooling of the gas as it expands from its high pressure condition into the relatively low pressure air bag. This cooling reduces the effective available volume of gas and requires a total storage volume significantly greater than if the gases were at an elevated temperature.

Another technique for generating gas in a short period of time is the pyrotechnic gas generator such as, for example, those presently employed in aircraft and aerospace applications. Typically the materials in these gas generators are double base gun powder or other rapidly reacting compositions that require a relatively constant high pressure in order to burn uniformly. With such a gas generator the container for storing the gas producing material must be capable of withstanding elevated pressures, and in order to maintain such a pressure a constricted flow path typically having a standing shock wave therein is provided for the gases generated. In the size range that might be suitable for a passenger restraint system the gas from a high pressure conventional gas generator may have to pass through an orifice one quarter to one half square inch in cross section. The design of the orifice and the pressure vessel required for containing the reaction is expensive. There are also significant safety hazards. The burning characteristics of the gas producing substances available does not permit ready tailoring of the pressure/time history of the reaction in a manner best suited for a passenger restrain system. Such gas generator systems are also undesirable since the reaction products may include many toxic and noxious gases, such as, for example, nitrogen oxides, carbon monoxide, hydrogen sulphide, hydrogen cyanide and ammonia.

It has been proposed to employ a "hybrid" system having a compressed gas cylinder and a small gas generator. The small amount of hot gases produced by the gas generator is mixed with the inert gas from the cylinder in order to warm it to a more desirable temperature. Such a hybrid system dilutes the toxic gases produced by the gas generator and permits a greater degree of tailoring the pressure/time characteristics of the bag inflation system. Except for this, the drawbacks of the gas generator and the pressurized gas reservoir are retained. The hybrid system has the further disadvantage of being relatively complicated and therefore costly.

In the systems hereinabove described for inflating passenger restraint, gas bag deflation is obtained by providing blowout panels, pressure responsive vent valves and the like for relieving the pressure within the bag and permitting the gases to escape. Such deflation systems must operate after the first impact has ceased in order to release the passenger who has been restrained and must retain the gas within the bag throughout the dangerous period of impact. The timing of such gas release systems is therefore critical and must be reliable under a broad variety of conditions.

It is therefore desirable to provide a means for inflating a gas bag for an automobile passenger restraint system with non-toxic gases that need not be stored at elevated pressures, are rapidly available without high pressure vessels, are safe, reliable, and preferably provide for deflation without relying on escape of gases from the inflated bag. The gas must also be directed into the bag over a substantial area for minimizing gas velocity and preventing rupture of the bag in the first stages of deployment.

BRIEF SUMMARY OF THE INVENTION

Therefore in practice of this invention according to a presently preferred embodiment there is provided a gas bag inflation system comprising a pressure resistant vessel with outlet passage means through which gas may flow freely into a means for distributing gas to a gas bag, and means for rapidly filling the vessel with pressurized gas in response to a signal. Preferably the means for filling comprises a pyrotechnic gas generator that provides principally water vapor and carbon dioxide.

DRAWINGS

Other advantages and features of this invention will be appreciated as the same becomes better understood by reference to the following detailed description when considered in connection with the accompanying drawings wherein:

FIG. 6 illustrates in end view the outlet of FIG. 5;

FIG. 7 is a longitudinal cross section of another embodiment of gas generator;

FIG. 8 illustrates semi-schematically a piezoelectric power supply for actuating a gas generator;

FIG. 9 is an electrical schematic of the piezoelectric power supply connected to a bridge wire initiator;

FIG. 10 is an electrical schematic of another embodiment of interconnection of the piezoelectric power supply to a bridge wire initiator;

FIG. 11 illustrates in elevation and two step cutaway another embodiment of gas bag inflator constructed according to principles of this invention;

FIG. 12 is a cross section of the inflator of FIG. 11; and

FIG. 13 is a longitudinal cross section of another embodiment of gas generator cartridge.

Throughout the drawings like numerals refer to like parts.

DESCRIPTION

Figure 1:
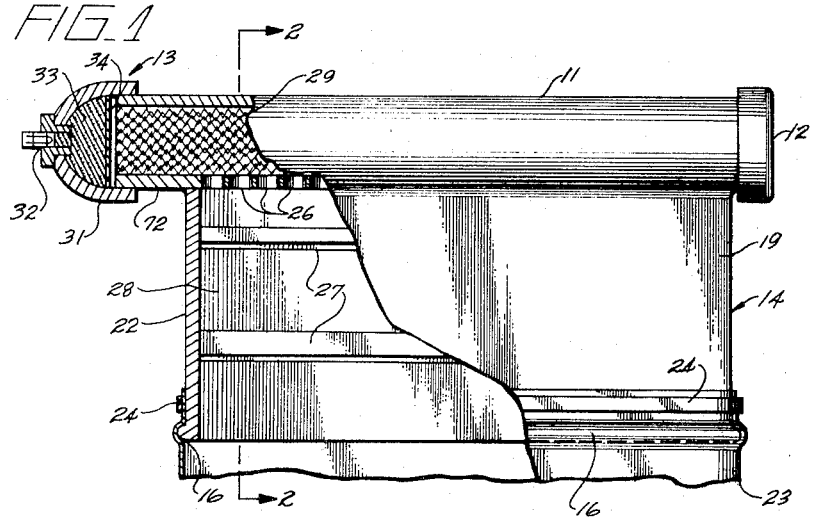
FIG. 1 illustrates in partial cross section a side view of a gas generator constructed according to principles of this invention.

FIG. 1 illustrates in partial cutaway a gas generator constructed according to principles of this invention such as may be employed for inflating a passenger restraint bag in an automobile, for example. The body of the gas generator comprises a cylinder 11 about 18 inches long which is conveniently made of conventional Schedule 10 steel pipe. One end of the pipe is preferably closed by a conventional pipe cap 12, and a gas generator cartridge 13 is threaded onto the opposite end. Welded along the length of the pipe 11 so as to extend out from one side is a diffuser 14 that is relatively narrower near its juncture with the pipe and relatively wider at its open outlet end, which may be 6 or 8 inches from the pipe. Preferably, a raised lip 16 is provided around the outlet end of the diffuser 14.

Figure 2:
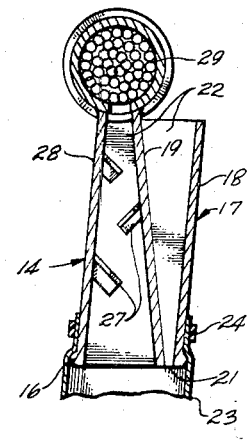
FIG. 2 is a transverse cross section of the gas generator of FIG. 1.

An optional feature best seen in the transverse cross section of FIG. 2 may be connected to the diffuser 14 if desired. This feature comprises an aspirator section 17 in the form of a wall 18 that converges with one wall 19 of the diffuser section 14 so as to provide a slot 21 extending along the length of the gas generator adjacent the outlet of the diffuser section 14. At their opposite edges the walls 18 and 19 are spaced relatively farther apart than at the slot 21 so as to provide a relatively larger inlet. End walls 22 close both the diffuser and aspirator sections.

When placed in use the gas generator is mounted within an automobile behind the dashboard, for example, by conventional mounting brackets which are not illustrated in the drawings. A conventional passenger restraint inflatable bag 23 of rubberized fabric or the like has an open mouth fitted over the outlet of the diffuser 14 and aspirator 17 portions of the gas generator. A strap 24 clamps the bag 23 in place so as to engage the lip 16 for retention as the bag is deployed and inflated.

Between the cylinder 11 and the diffuser portion 14 a plurality of holes 26 are drilled through the wall of the pipe so as to provide free fluid communication between the interior of the pipe and the interior of the diffuser portion. Typically, the total cross-sectional area of the holes 26 is about the same order of magnitude as the area of the means for generating gas hereinafter described. By same order of magnitude is meant that the cross sectional area is not greatly different, typically within about minus 50 percent and plus 100 percent of each other. Preferably, when two or more regions of restricted cross-sectional area are arranged serially, the downstream one in the direction of gas flow should be no smaller than about 50 percent of the area of the upstream one. The downstream region of restricted flow can be several times larger than the upstream area without detriment, but best results are obtained when the downstream area of restricted flow is less than about three times the upstream area, that is, the areas are of the same order of magnitude. It will be apparent that other provisions made be made for fluid communication between the pipe and diffuser, such as, an elongated slot if desired so long as the structural integrity of the gas generator is maintained. Within the diffuser section there are welded three flat baffle plates 27 extending substantially the full length of the diffuser. Two of the baffle plates are welded to one wall 28 of the diffuser, and the other baffle is welded to the opposite wall 19. The baffle plates are mounted at an angle relative to the walls and approach the opposite wall within a distance that provides a cross-sectional area for fluid communication around the baffle somewhat larger than the cross-sectional area through the holes 26. Thus, for example, the cross-sectional area between the edge of a baffle and the opposite wall may be in the order of about 8 or 9 square inches.

Within the cylinder 11 is a sound baffling array of wires 29, which is quite conveniently a plurality of intertwined ¼ inch helixes of steel wire. Such a material is readily available since it is commonly used for fabricating flexible fireplace screens or the like. In such a material, each of the helixes is intertwined with a pair of adjacent helixes so as to form a sheet-like array. It is convenient to roll up such an array of the proper width and length and push it into the pipe before the gas generator cartridge 13 is installed. As will be apparent hereinafter, the array of wires 27 in the cylinder serves to muffle the sound produced upon initiation of the gas generator, serves to some extent as a flame arrester, and also resists ejection of unburned particles of material from the gas generator. Although it is preferred to employ the intertwined helixes of wire illustrated in the preferred embodiment, many other similar arrays of wires will be apparent to one skilled in the art. Thus, for example, woven wire arrays or mats such as coarse metal turnings can be employed if desired.

Threaded onto the end of the cylinder 11 is a gas generator cartridge 13. In this embodiment, the cartridge 13 has an approximately hemispherical steel chamber 31 having a conventional bridge wire initiator 32 threaded into an aperture on the opposite end thereof from the cylinder 11. The interior of the chamber 31 is packed with compacted gas generator powder 33, and the powder is enclosed by a hermetic seal 34 so that air and moisture are excluded.

The initiator 32, which is not illustrated in detail herein, can be any of a number of conventional electrical initiators or "squibs". The initiators are typically bridge wire devices having a pair of conductive posts between which is a very fine wire. In a hot bridge wire initiator, a sufficient current is passed through the small diameter wire that it is heated to an incandescent temperature. A small amount of sensitive reaction composition, such as, for example, black powder or a mixture of high purity zirconium powder and potassium perchlorate is provided on or adjacent the bridge wire. The hot wire causes the reaction composition to react, thereby liberating a relatively large amount of heat, thereby providing an ignition source. The reaction composition within the initiator may be supplemented with additional reaction mixture of a different composition, if desired. Thus, for example, in a hot bridge wire initiator particularly preferred for practice of this invention, about 30 milligrams of a mixture of high purity zirconium powder and potassium perchlorate is provided adjacent the bridge wire. An additional 150 milligrams of a mixture of sucrose and potassium chlorate is also provided within the initiator. By providing the proper size bridge wire and such a reaction composition, as much as one amp of current and one watt of power can be dissipated in the initiator without the reaction commencing. It is desirable to have an initiator capable of withstanding such a current so that stray electric fields, such as from radio transmission equipment, do not accidentally initiate the reaction.

In another type of conventional initiator, a bridge wire is provided in series with a high voltage spark gap. When a sufficient power level is applied across the spark gap, the sudden burst of current flow through the bridge wire causes such rapid heating that the bridge wire literally explodes with a sudden burst of energy release that initiates a reaction in a mixture such as may be employed in a hot bridge wire initiator.

In either case, the conventional initiator is typically closed on its end by a thin metal sheet that provides a hermetic seal to protect the reaction mixture therein. The thin metal sheet may be a sufficiently low melting material or held in place by a sufficiently low melting material that when the reaction composition reaches an elevated temperature the sheet is melted and ejected. In other embodiments, a higher melting sheet may be employed with scoring across its face so that when pressure builds up within the initiator the sheet ruptures and peels back, permitting the hot reaction products to be ejected from the initiator.

The powder 33 in the chamber 31 is preferably a pyrotechnic mixture comprising powders of an oxygen bearing oxidizer material and a carbon-hydrogen-oxygen bearing organic fuel substantially free of nitrogen, sulfur, fluorine, or other elements that may form noxious or toxic gases upon reaction. Preferably, the organic fuel has a formula $C_xH_yO_z$ where $x$, $y$ and $z$ are integers, such as, for example, sucrose, starch, cellulose, and other carbohydrates which are solid below about 165°F, which is the maximum temperature typically encountered in a closed automobile, and which are available in powder form with an average particle size less than about 25 microns.

The oxidizing powder is preferably potassium chlorate or potassium perchlorate, and the proportion relative to the organic reducing material is preferably near stoichiometric or, if anything, slightly oxygen rich, so that upon combustion of the oxidizing and reducing powders, a gas is produced that is substantially completely carbon dioxide and water vapor. Other chlorates and perchlorates of the alkali and alkaline earth metals can be employed if desired, but the potassium compounds are preferred since a reaction product is potassium chloride which is more stable than potassium oxide and is volatile at the temperature of reaction. Since potassium oxide is not formed, there is no reaction with water to produce potassium hydroxide which is corrosive. The oxidizing and reducing powders react to produce gas that is substantially completely carbon dioxide, water vapor, and potassium chloride vapor, and is therefore substantially free of carbon monoxide and nitrogen, sulfur, or flourine bearing compounds which may be noxious or toxic. Additional details and many variations of oxidizing and reducing compositions particularly suitable for pratice of this invention are described in greater detail in the aforementioned copending patent application.

In addition to the oxidizing and reducing powders within the gas generator cartridge, there may also be provided an endothermic decomposition coolant powder, preferably selected from the class consisting of carbonates, bicarbonates, and hydrated oxides of metals having oxides stable in the presence of water, such as, for example, magnesium carbonate, zinc carbonate, borax, hydrated magnesium carbonate, or hydrated barium oxide. Such materials when heated by the oxidation-reduction reaction decompose to yield carbon dioxide or water vapor, or both. Since this decomposition is endothermic, the gases produced by the oxidation-reduction reaction are cooled and comingled with the cooler gas produced from decomposition. The result is that the gases entering the gas bag are at a lower temperature than would be the case if the oxidation-reduction reaction gases were passed directly into the bag. Also by releasing additional carbon dioxide and water vapor the decomposition coolant enhances the volume of gas that is produced, and by appropriate selection of the coolant the composition of the gas can also be predetermined so as to be more or less rich in water vapor as may be desired.

The decomposition coolant powder can be provided in a separate portion of the cartridge so as to be heated by the reaction products of the oxidation-reduction reaction, in which case both the cooling effect and the enhanced volume effect are obtained. If desired the coolant powder can be intimately mixed with the oxidation-reduction powders so that in addition to cooling and increasing the volume of the gases the cooling effect also cools and thereby slows the reaction. By slowing the oxidation-reduction reaction, the volume of gas produced in a given time interval is decreased, and by appropriate arrangements and compositions the pressure/time pattern of gas generation can be regulated in order to obtain optimum gas bag deployment and inflation.

The oxidation-reduction powders preferably employed in the practice of this invention deflagrate rather than detonate, that is, the rate of propagation of the reaction through the mixture is less than sonic velocity. The composition is also distinguished from many other reaction mixtures in that two different rates of reaction may be obtained depending on the reaction initiation conditions. Thus, for example, if the oxidation-reduction composition is arranged in a container having a closed end and an open end, and the reaction is initiated from the open end of the container, relatively slow deflagration occurs and tens of seconds may be required to complete the reaction throughout the mixture in the vessel. If, on the other hand, the same arrangement of composition is ignited from the closed end of the vessel, the hot gases produced by the reaction must pass through the powdered materials thereby rapidly heating them and causing the reaction to proceed at a sufficiently higher rate that the reaction may be complete in time intervals measured in the order of milliseconds. Thus, merely by changing the point of initiation of the reaction two or three orders of magnitude of difference in reaction rate can be obtained.

In operation of a gas generator such as illustrated in FIGS. 1 and 2 an electrical signal is applied to the bridge wire initiator 32 when an impact of the automobile is sensed. The sensing system for detecting impact of an automobile, such as would be involved in a collision, is conventional or may be provided by a piezoelectric sensor as described and illustrated in greater detail hereinafter. The signal to the initiator is sufficient to heat or explode the bridge wire and cause the reaction composition within the initiator to ignite. The energy generated by the reaction of this composition is transmitted to the powders 33 in the chamber 31, thereby igniting the composition. Since ignition occurs at the closed end of what is in effect an open cup closed only by thin hermetic seal 34, the reaction proceeds quite rapidly to produce a gas consisting essentially of carbon dioxide, water vapor, and vaporized potassium chloride. This gas rapidly fills the cylinder 11 as it passes through the array of wires 29 therein. The gas passes through the large holes 26 between the cylinder 11 and the diffuser section 14 and then pass through the tortuous path around the baffles 27 in the diffuser section. When the gases reach the open outlet of the diffuser they enter the gas bag 23 so as to inflate it. Since the oxidation-reduction reaction is quite rapid, complete inflation of the gas bag may be obtained in the order of about 20 milliseconds.

If the gas bag is connected directly on the diffuser section without an aspirator 17, inflation of the bag is obtained by a mixture of carbon dioxide, water vapor, and vaporized potassium chloride at a rather elevated temperature. The high temperature gases in the bag rapidly cool by heat transfer to and through the bag and to other associated elements of the system, and the potassium chloride vapor and water vapor condense, thereby rapidly decreasing the volume of gas within the bag. Likewise, since the temperature drops, the carbon dioxide contracts, also tending to reduce the volume of the bag. Such reduction in volume of gas within the bag becomes substantial after about 100 milliseconds, so that after an automobile has suffered an impact the passenger restraint bag deflates so that a passenger is not trapped within a vehicle. Similarly, if the restraint bag were accidentally initiated, the relatively brief restraint of the driver would not lead to loss of control of the vehicle. Since the gases filling the bag are almost entirely carbon dioxide, water vapor and potassium chloride, which rather quickly condenses out, there are no noxious or toxic materials which might jeopardize a passenger in case of a leak or rupture of the bag.

If an aspirator 17 is employed in conjuction with the gas generator, the high flow rate of gas out of the outlet of the diffuser 14 tends to suck in or aspirate gas through the slot 21 in a well-known manner. The aspiration of air from within an automobile through the aspirator tends to cool the gases entering the bag, since the cooler air comingles therewith, and this cooling effect is offset by the enhanced volume of air pulled into the bag. Further, the open slot 21 of the aspirator remains after gas flow from the generator ceases, providing a controlled cross-sectional area for release of gas from the gas to permit rapid deflation. This reverse flow of gas acts in parallel with the condesation and contraction effects for controlled deflation.

The array of wires 29 in th cylinder 11 serves to muffle the rather high sound level that accompanies the rapid oxidation-reduction reaction. The wires also inhibit the ejection of particles from the gas generator cartridge into the gas bag, which might induce failure thereof. The array of wires also serves as a slight heat sink in order to somewhat cool the initial flow of gases so that the gas first reaching the gas bag upon the initiation of deployment is cool enough that no damage occurs to the bag. The array of wires also serves as a flame arrester for inihibiting flow of burning composition or hot particles into the gas bag.

The baffles 27 in the diffuser section require the gas to flow through a tortuous path with rebounds against several solid surfaces, which to some extent tends to muffle the noise, but more particularly assures that flow out of the diffuser is subsonic. It appears that sonic flow of gas from the diffuser may result in high energy absorption by a conventional gas bag, thereby leading to failure of the bag, and provision of baffles in the diffuser section assures that gas flow is subsonic. Other techniques may be used for assuring subsonic flow, such as compacting the powders to high density or providing a passage therethrough, as described and illustration hereinafter, and in such embodiments it may be possible to delete the baffles in the diffuser section.

A distinction should be noted between the described gas generator and gas generator arrangements such as commonly employed in aerospace and aircraft applications. In the prior gas generators in order to obtain fast and uniform burning of the gas generating composition, it was necessary to maintain the composition at an elevated pressure throughout the reaction. This is typically accomplished by providing a constricted nozzle through which the gas must flow so that the gas is generated within a relatively high pressure container, flows through the nozzle in which a standing shock may be generated, and then is distributed to the location where it is to be used. This requires high pressure vessels, sonic flow rates, rather high sound levels, high temperatures, and similar inconveniences and hazards. In the reaction provided in practice of this invention, however, the reaction proceeds at low pressures, including even ambient pressure.

Thus, in order to avoid dangerously high pressures within the gas generator, a substantially open flow path is provided between the gas generator cartridge and the outlet into the gas bag. A hermetic seal 34 is provided over the gas cartridge, but this is *not*, as in some high pressure gas generators, a high pressure rupture diaphragm that permits the pressure to build to a high level before the system is opened. A thin sheet of aluminum foil, synthetic mica, or even plastic may suffice to give a hermetic seal witout pressure containment. Although some pressure is required for rupturing the hermetic seal, this is merely ancillary to perforance of the gas generator.

The array of wires 29 in the cylinder is quite open and does not provide for substantial obstruction of gas flow, and because of the highly irregular path that the gas must follow sonic flow is avoided. The holes 26 between the cylinder and the diffuser are provided with as large a cross-sectional area as feasible so as to inhibit formation of a standing shock wave in the most constricted portion of the gas flow path. It will be recalled that the cross-sectional area of gas flow through the holes 26 is in the order of six inches, which is to be contrasted with the ¼ to ½ square inch cross-sectional area of a typical gas generator nozzle. If sonic flow should occur in the region adjacent the holes 26, the baffles 27, which force the gas to flow through a tortuous path and serve to reflect shock waves, prevent any sonic flow or shock wave from reaching the gas bag itself.

Figure 3:
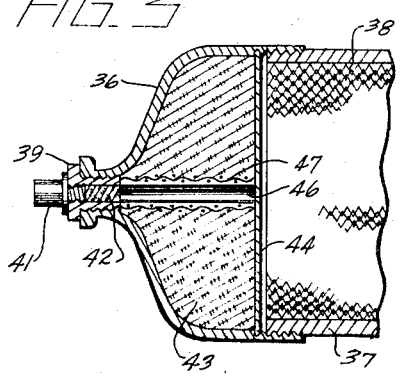
FIG. 3 is an enlarged view of a gas generating cartridge for a gas generator like that illustrated in FIG. 1.

FIG. 3 illustrates in transverse cross section a slightly different embodiment of gas generator cartridge constructed according to principles of this invention. As illustrated in this embodiment, a generator chamber 36 is threaded onto a tube 37 of a gas generator, which may be like that illustrated in FIG. 1 or have some other suitable configuration. An array of wires 38 is provided in the tube 37, as hereinabove described. Typically, the tube 37 may be conventional 2-inch pipe, and it is convenient in such an arrangement that the chamber 36 be a conventional pipe reducer from 2 inch to ½ inch standard pipe threads. Threaded into the smaller threads of the reducer 36 is an adapter 39 which receives a conventional bridge wire initiator 41, as hereinabove described. Within the bore of the adapter 39 is a compacted body of oxidation-reduction gas generator powder 42 of a composition such as hereinabove described or described in the aforementioned copending patent application.

The larger portion of the reducer 36 is also packed with an oxidation-reduction gas generator powder 43, which is sealed in place by a hermetic seal 44 for protecting it from the environment. An axial passage 46 extends from the body 42 of powder in the adapter to the hermetic seal 44. The annular body 43 of powder is preferably formed by wrapping an aluminum screen 47 around a rod (not shown) having the desired diameter of the passage. This assembly is inserted against the body of powder 42 in the adapter, and the reaction mixture is tamped into place within the chamber 36. Some of the powder sifts through the aluminum screen 47 so as to pack pack tightly around the rod which is subsequently withdrawn to leave the passage open. The screen 47 serves to maintain the passage 46 open, even when the gas generator cartridge is subjected to vibrations such as would be encountered in an automobile. Upon reaction of the powders, the aluminum screen is melted and/or oxidized and does not interfere with operation of the gas generator. It will be apparent that if desired a small amount of adhesive can be applied to the surface of a rod before the powder is tamped into place so that the walls of the passage 46 are formed of adhesively bonded powder and the passage is thereby maintained open. Other suitable arrangements will be apparent to one skilled in the art.

As mentioned hereinabove, the reaction rate of the oxidation-reduction composition is relatively high when initiation occurs at the closed end of a vessel, such as, for example, the chamber 36. It is believed that the high rate of reaction is due to hot gases passing through the permeable body of powder in advance of the initiation of reaction, thereby tending to heat the mixture to its auto-ignition temperature. It has been found that by providing a passage through the powder at least a portion of the gas can pass to the open end of the cartridge without passing through the powders, and the overall rate of reaction is thereby reduced. By enlarging the passage 46 through the reaction mixture the reaction may be slowed so that the peak pressure that occurs in the gas generator is delayed in time.

Thus, by varying the quantity of coolant powder that may be intimately mixed with the oxidation-reduction composition, and also by controlling the geometry of the passage through the mixture, the reaction rate can be controlled for obtaining a desired pressure/time history in the gas generator for obtaining optimum bag deployment and inflation.

As mentioned hereinabove, the flow of hot gas through the powders is believed to be responsible for rapid reaction thereof. It therefore follows that if the permeability of the powders is reduced, the quantity of gas flowing therethrough is reduced and the reaction is slowed. Such an effect is found, and it is therefore preferred that the powders be compacted with a pressure less than about 5000 psi so that substantial pore volume remains in order to obtain a high reaction rate. If the pressure is increased significantly above about 5000 psi the pore volume is reduced and the reaction rate is significantly reduced.

Figure 4:
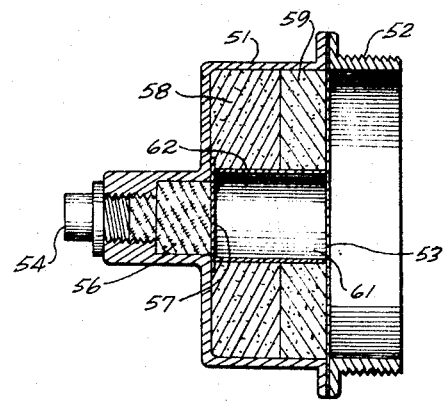
FIG. 4 is an alternative embodiment of gas generator cartridge.

FIG. 4 illustrates another embodiment of gas generator cartridge constructed according to principles of this invention in which the effect of compaction of the powders can be utilized for tailing the time/pressure history in the gas generator. As illustrated in this embodiment the gas generator cartridge comprises a chamber 51 to which is connected an adapter ring 52 having a male thread thereon for attachment to a gas distributor, such as, for example, that illustrated in FIG. 1. The flanges on the chamber 51 and ring 52 are interconnected in a conventional manner, such as, for example, by cold welding, adhesive bonding, mechanical fasteners or the like. This affords a convenient way of providing a hermetic seal 53 across the face of the gas generator cartridge. Such a seal may be, for example, fabricated of a thin metal foil, a sheet of synthetic mica, or a plastic membrane, as may be desired for the service required thereof.

At the opposite end of the chamber 51 a conventional bridge wire initiator 54 is threaded in place. A body of oxidation-reduction powder 56 is provided in a necked-down portion of the chamber 51, and this may be lightly tamped into place in order to remain intact under vibration, or as illustrated in FIG. 4, it may be substantially loose powder held in place by a thin sheet 57 of synthetic mica, aluminum foil, or a suitable plastic material.

Within the larger portion of the chamber 51 is a compacted tablet 58 of oxidation-reduction composition, which may or may not include coolant powder as desired. The tablet 58 is preferably pressed with a sufficient pressure to yield a desired reaction rate, which can be readily determine for a selected geometry and composition by routine experimentation. Between the tablet 58 of oxidation-reduction material and the hermetic seal 53 is another body 59 of powder which may be somewhat compacted coolant powder or, if desired, be coolant powder comingled with oxidation and reduction powders in any desired proportion. Preferably, the body 59 of powders is sufficiently compacted to be self supporting as is the tablet 58 so that axial passage 61 can be provided through the gas generator cartridge. If the body 59 of powder is not self supporting, a very thin aluminum or plastic sleeve 62 may be provided around the passage 61 for holding the powder in place until used.

When the gas generator cartridge of FIG. 4 is initiated by the bridge wire initator 54, the body of powder 56 in the necked-down portion which is relatively non-compacted, either because it was not pressed or pressed with only light pressure, reacts quite rapidly to produce a volume of hot carbon dioxide and water vapor. These gases melt and erode away the aluminum or plastic sleeve 62, if employed, and rapidly heat the tablet 58 to its auto-ignition temperature. Deflagration of the tablet 58, and of the powder 59 if containing oxidizing and reducing powders, continues to generate gas after the powder 56 in the necked-down portion of the chamber is dissipated. This provides a sustaining flow of gas for completing inflation of the gas bag or maintaining inflation for any selected time period as the gas is originally passed into the bag cools and condenses. The gas is generated by the pyrotechnic tablet 58 and the decomposition coolant powder in the bore 59 and these combine to provide relatively cool gas having a controlled composition for flow into the gas bag. It will be apparent to one skilled in the art that by providing separate bodies of reaction mixtures having varying degrees of compaction, differing compositions, and selected geometries that virtually any selected pressure/time distribution of gas generation can be provided.

Figure 5:
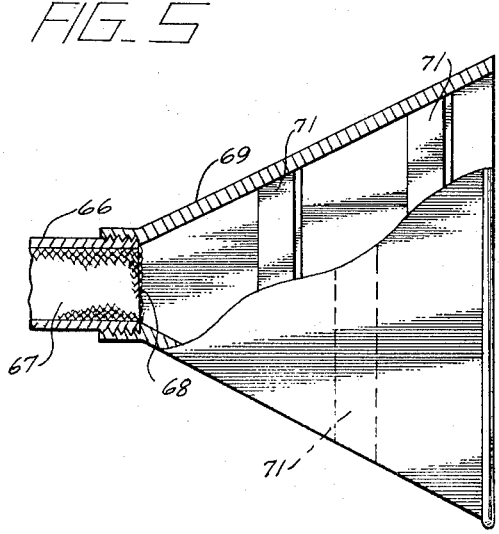
FIG. 5 is a partial cross sectional view of the outlet of another embodiment of gas generator constructed according to principles of this invention.

FIG. 5 and 6 illustrate in partial cross section and end view, respectively, a gas distribution portion of a gas generator constructed according to principles of this invention. As illustrated in this alternative embodiment, a cylinder 66 is packed with an array of wires 67 in substantially the same manner hereinabove described. A screen or perforated metal sheet 68 over the open end of the tube 66 helps retain the wires in place and also helps prevent hot particles from being ejected from the gas generator. A diffuser portion 69 is threaded onto the end of the tube 66 so as to flare towards a relatively larger outlet, which in the illustrated embodiment is rectangular but which may be circular or other desired cross section and to which a gas bag (not shown) may be connected. Within the diffuser 69 are transverse baffles 71 for providing a tortuous path through the diffuser portion for inhibiting sonic flow of gas out of the gas generator. In FIG. 6 a portion is cut away to illustrate the screen 68 which would otherwise be hidden by the baffles 71.

A gas generator system as illustrated in FIGS. 5 and 6 may be advantageous when the principal length of the gas generator is transverse to the dashboard of an automobile, for example, instead of being parallel to it.

Many other arrangements of gas generator within principles of this invention will be apparent to one skilled in the art. Thus, for example, instead of connecting a gas bag around a lip at the outlet of the diffuser section, substantially the entire gas generator can be provided within the confines the bag and a seal made, for example, to the gas generator at a cylindrical portion 72 adjacent the gas generator cartridge 13 in the embodiment of FIG. 1. With such an arrangement, the cylinder 11 and diffuser 14 are completely within the bag (no aspirator 17 would be employed), and only the gas generator cartridge 13 would be outside of the bag. It will be apparent that with the gas distribution portion of the gas generator within the bag other possible geometric configurations are readily provided.

FIG. 7 illustrates semi-schematically in transverse cross section an alternative technique for controlling the pressure/time distribution of gas generation in a gas generator constructed according to principles of this invention. As illustrated in this embodiment, a tube 75 is provided having a plurality of holes 76 along its length for permitting gas to escape therefrom (an array of wires may be provided in the tube, but is not illustrated in order to show the holes 76 more clearly). On one end of the tube 75 is threaded a cap 77 within which is a body 78 of oxidation-reduction pyrotechnic powder which may or may not include a coolant powder as may be desired. At the opposite end of the tube 75 a gas generator cartridge 79 is threaded. A bridge wire initator 80 is threaded into the cartridge 79 and the interior is packed with a pyortechnic mixture 81, such as described hereinabove. An axial passage 82 through the mixture 81 may be employed for controlling the burning rate as hereinabove described. Preferably, hermetic seals (not shown) are provided over the pyrotechnic powders to protect them from the environment.

When a gas generator such as illustrated in FIG. 7 is used, a signal to the initiator 80 ignites the mixture 81 in the gas generator cartridge, which produces an initial quantity of high temperature gases for deployment and inflation of a gas bag as hereinabove described. The hot gases, in turn, ignite the body of pyrotechnic mixture 78 in the opposite end cap. As mentioned hereinabove, when such a mixture is ignited at an open end where gases are free to escape, the reaction rate is relatively slow and gas may be generated over a considerable period of time, possibly amounting to many seconds so that a gas bag can be maintained in an inflated condition for a more prolonged period if desired.

FIG. 8 illustrates semi-schematically a simple, reliable and highly safe means for sensing an automobile collision and initiating inflation of a gas bag in response thereto. For optimum safety, it is preferred that the bridge wire initiator requiring a relatively high amount of energy be employed for ignitiing a deflagration mixture such as provided hereinabove. If a hot wire initiator is employed, this can be connected directly to the automobile battery for providing the electrical energy for heating the bridge wire. One must then provide a sensor connected to a frame member or the like of the automobile for detecting the very rapid deceleration that occurs upon a collision impact. The sensor provides either a mechanical or electrical signal for operating a switching mechanism or electronic switch which forwards a firing signal to the bridge wire initiator.

The wiring leading to a hot bridge wire initiator may serve as an antenna and intercept radio frequency emanations which result in stray currents in the bridge wire, which may accidentally initiate the reaction. Such effects are minimized by electric shielding and maintaining the lead wires as short as possible and, further, by providing a relatively insensitive reaction mixture in the initiator so that a relatively high temperature in the bridge wire is required for ignition. A danger remains, however, despite such precautions. In addition, the reliability of the system is degraded by requiring sensors and switching arrangements for applying a sufficient power level to the bridge wire to initiate the reaction.

In order to increase the safety of such a system an exploding bridge wire may be employed, which requires a relatively high voltage in order to be initiated. Such a bridge wire is typically arranged in series with a spark gap which may require several hundred volts before current can flow. Although highly safe, an exploding bridge wire initator requires complex and expensive electronic circuitry in order to generate sufficient voltages and maintain these voltages in a state of readiness for initiating the reaction quickly and reliably.

FIGS. 8 and 9 illustrate an arrangement for sensing collision and actuating a bridge wire, such as an exploding bridge wire, quickly and reliably and with inexpensive components. FIG. 8 illustrates semi-schematically a sensor and power supply for both sensing the instant of impact and providing a sufficient electrical signal for firing a bridge wire initiator. According to this arrangement, a stack of several piezoelectric crystals 85, which are preferably in the form of thin disks of barium titanate, lead zirconate titanate, or similar material, are stacked in face to face engagement with one end of the stack secured to a rigid member 86. At the opposite end of the stack there may be provided an inertia mass 87. The rigid member 86 preferably faces towards the rear portion of the vehicle and is a relatively immovable portion thereof so that in a collision the rigid member 86 quickly slows down in response to the impact. In a preferred embodiment, the rigid member 86 may be a portion of, or directly connected to, the gas generator itself.

When upon impact the rigid member 86 rapidly decelerates, the inertia mass 87 bears on the opposite end of the stack of piezoelectric crystals 85 so as to press them tightly together. When a piezoelectric material is subjected to a mechanical force of this nature, an electrical voltage is induced thereacross, with the magnitude of the voltage being dependent on the degree of mechanical stress. Generally speaking, a piezoelectric material does not provide a sufficient power level for firing a bridge wire initiator of a sufficiently high power level to be safe enough for use in an automobile. In order to obtain such a power level, therefore, a plurality of piezoelectric crystals are employed in an arrangement where the effects of deceleration are additive.

As better seen in FIG. 9, the individual piezoelectric crystals are alternated so that the polarity of alternating crystals 85a is in one direction and the polarity of the intervening crystals 85b is at the opposite polarity. A thin metal layer 88 is provided on the faces of the crystals for receiving the electric signals generated upon mechanical stressing. Alternate ones of the metal layers 88 are connected to one elctrical lead 89 and the intervening alternate layers of metal are connected to another electrical lead 91. With such an arrangement, when the stack of piezoelectric crystals is mechanically stressed the currents from the several disks are additive so that the current that can flow through the leads 89 and 91 is, of example, 75 times the current from one of the crystals if 75 crystals are used in the stack. By connecting the piezoelectric disks mechanically in series and electrically in parallel, a substantial power level can be provided between the leads 89 and 91.

A stack of about 75 piezoelectric crystals each 0.2 inch thick and about ¾ inch diameter and connected in parallel, as illustrated in FIG. 9, is capable of providing a power level of about $10^6$ ergs which is more than sufficient for firing an initiator which may, for example, require only about $10^5$ ergs, or less. In a typical circuit, as illustrated in FIG. 9, the leads 89 and 91 are interconnected by a capacitor 92 across which a high voltage level may be induced upon sudden stressing of the piezoelectric stack. A spark gap 93 in series with the bridge wire 94 of an initiator is connected across the capacitor 92. When the voltage level builds up to 1000 volts, for example, the spark gap 93 sparks, passing current through the bridge wire 94 for firing the initiator.

If desired, rather than providing an inertia mass 87 directly connected to the end of the piezoelectric stack, as illustrated in FIG. 8, a spring-biased inertia mass may be employed in a position whereby it is thrown against the piezoelectric stack when a collision impact occurs. Such an arrangement may provide a sharper pulse than the piezoelectric stack with the inertia mass connected directly thereto. It should also be noted that with a sufficiently sensitive stack and initiator the inertia mass may be deleted completely, and the inertia of the piezoelectric stack itself may provide a sufficient power level.

The piezoelectric stack not only senses the collision impact but also provides the energy pulse for firing the initiator which ignites the gas producing composition. By mounting the piezoelectric stack directly on or near the gas generator, the lead length can be kept low for minimizing radio interference problems. Since the stack provides both sensing and the energy for firing, complex and expensive electronic circuits are avoided.

FIG. 10 illustrates an alternative circuit in which a piezoelectric stack 96 is used for firing a bridge wire 97 of an initiator. This circuit is substantially identical to the circuit of FIG. 9 except that a conventional diode bridge 98 is added between the piezoelectric stack 96 and a capacitor 99. This circuit takes advantage of the fact that reversal of mechanical stress on the piezoelectric crystals causes a reversal of polarity of the electric signal, and this reversal is utilized to enhance the power level from the stack and, hence, the power level applied to the bridge wire.

FIGS. 11 and 12 illustrate another embodiment of gas generator constructed according to principles of this invention. As illustrated in this embodiment, the generator has a cylindrical housing 101 having a larger internal volume than that provided in the embodiment of FIGS. 1 and 2. Typically, for example, the housing 101 may be about 25 inches long and 4 inches in diameter to give an internal volume of about 300 cubic inches. An end plug 102 is welded into the end of the housing 101 and includes an extending nipple 103 onto which a generally cup-shaped gas generator cartridge 104 is threaded.

Within the cartridge 104 is a body of pyrotechnic mixture 106 which is preferably a stoichiometric mixture of sucrose and potassium chlorate, as hereinabove described. An endothermic coolant powder may be incorporated in the mixture 106, however, in the illustrated embodiment it is preferred that it be absent. A conventional bridge wire initiator 107 is threaded into the substantially closed end of the cartridge 104 for igniting the mixture. Preferably, the mixture 106 is pressed into place in the bore of the cartridge at a pressure less than about 5000 psi.

A metal diaphragm 108 is cemented in place over the compacted powders 106 to provide a good hermetic seal. A second diaphragm 109 may be cemented in place in the cartridge or held in place and sealed by the threaded portion of the nipple 103. Synthetic mica or plastic diaphragms can also be used. Between the two diaphragms 108 and 109 is a trapped body of water 11, typically, for example, weighing about 30 grams to accompany about 60 grams of the pyrotechnic mixture 106.

A plurality of holes 112, typically ¼ inch diameter are provided through the wall of the housing 101 in a pair of rows along one side of the length thereof. Sufficient holes are provided for giving an aggregate cross-sectional area of about 2 to 3 square inches. The holes have an aggregate area about the same as the cross-sectional area of the gas generator cartridge 104. The holes 112 communicate to the narrower end of a flaring diffuser 113. Thus, in the center cutaway portion of FIG. 11 the narrower base of the diffuser 113 is seen in cross section for exposing the holes 112. Nearer the left side of FIG. 11 the mouth of the diffuser is seen in elevation.

As best seen in the left-hand portion of FIG. 11 and in the cross section of FIG. 12, a pair of roughly heart-shaped bodies 114 are provided within the diffuser. The bodies 114 do not have a re-entrant portion as the usual heart but are bluntly curved at their inner ends, that is, nearer the housing 101 and are substantially pointed at their outer ends adjacent the more widely flared mouth of the diffuser. A half-heart body 116 is provided adjacent the end wall 117 of the diffuser. These heart-shaped bodies 114 and half-heart-shaped bodies 116 extend between the flaring walls of the diffuser 113 so that no substantial gas flow occurs through the region blocked by these bodies. Instead, between the massive bodies in the diffuser there are constricted throats 118 through which gas may pass. The aggregate cross-sectional area of the three throats 118 through the diffuser is about the same as, or as much as about 50 percent more than the aggregate cross-sectional area of the holes 112 leading into the narrow end of the diffuser.

When the gas generator illustrated in FIGS. 11 and 12 is used, the bridge wire initiator 107 ignites the pyrotechnic mixture 106 in the gas generator cartridge 104. The hot gases, principally carbon dioxide and water vapor, plus vaporized potassium chloride, rupture the diaphragms 108 and 109 and comingle with the water 111 trapped therebetween. This comingling serves to substantially cool the hot gases and vaporize the water to produce a rather large volume of water vapor and carbon dioxide at nominal temperatures.

This volume of gas expands into the enlarged interior of the housing 101 and flows through the holes 112 into the diffuser. The gases expand into the region of the diffuser upstream from the throats 118 and then flows through the throats towards the open flaring end of the diffuser to which a gas bag (not shown) may be attached.

Several beneficial results are obtained by an arrangement such as illustrated in FIGS. 11 and 12. By using water adjacent the pyrotechnic mixture, a large volume of gas is generated at reasonable temperatures, and further any tendency to eject hot particles from the pyrotechnic mixture is inhibited. In other gas generator arrangements, small burns are sometimes seen in the gas bag due to ejection of hot particles. In one series of tests employing liquid water adjacent a pyrotechnic mixture, 25 successive inflations of the same gas bag were conducted, and inspection thereafter showed no evidence whatsoever of burns.

By expanding the gas into the relatively larger internal volume of the housing 101 and then passing it through the only slightly constricted holes 112, a significant buffering or accumulator effect is apparently obtained for minimizing the initial shock on the air bag, thereby minimizing any tendency to rupture the bag during the initial stages of deployment. This effect is further enhanced by the enlarged and then constricted portions of the diffuser 113, and it is believed that the holes 112 and throats 118 cooperate to assure that gas from the diffuser is always subsonic for preventing damage to the air bag.

The region between the holes 112 and the throats 118 has a much larger flow cross section than either the holes or throats. There are indications that provision of the downstream throats may not be necessary in all circumstances and the limited area of holes 112 may be sufficient for obtaining reliable bag inflation.

Such an arrangement is also advantageous in minimizing the sound level from the gas generator when it is actuated. In the embodiment illustrated in FIGS. 11 and 12, the housing 101 is free of the array of wires provided in the other embodiments hereinabove described and illustrated. Satisfactory performance of the gas generator is obtained without such an array, but such use is contemplated for additional sound muffling as may be desired.

To some extent the arrangement illustrated in FIGS. 11 and 12 has a pressure cycle resembling that from a container of compressed gas. In effect, the enlarged volume of the housing 101 forms a pressure vessel that is normally empty and is filled rapidly by the pyrotechnic mixture. Since gas flows out through the holes 112 as the housing fills and the pressure buildup is not instantaneous, the maximum pressure in the housing is less than that needed in a gas container of similar volume. This effect is also enhanced since the gases are relatively hot when put into the housing. The housing thus serves as an accumulator for pressurized gas when the cartridge is fired and at the same time permits gas to flow continuously out of the housing through the holes having controlled cross-sectional area. Since the peak pressure in the housing is lower than in a similarly sized gas container for inflating a gas bag lower cost construction is also possible. This effect is greatly enhanced because the peak pressure is applied for only a few milliseconds at most. The criteria for designing a pressure vessel capable of withstanding a given pressure for such brief intervals are much less strigent than for gas containers that must resist pressure for long periods, thereby further reducing costs.

The substantial volume of about 300 cubic inches adjacent the gas generator cartridge with an aggregate area of about two square inches for gas to flow from that volume has proved excellent for gas bag inflation. If the volume were smaller, the area of the downstream gas flow passage would need to be decreased to obtain a similar pressure/time cycle at the bag. This would increase the pressure requirements of the housing and increase cost. If the housing is greatly larger, the effect is compensated with larger gas flow area, but the space requirements for the assembly within an automobilie may be a significant limitation.

FIG. 13 illustrates in longitudinal cross section another embodiment of gas generator cartridge constructed according to principles of this invention. Such an arrangement is particularly useful in a passenger restraint bag such as may be positioned in the center of a steering wheel. In such a position, a passenger restraint bag having an internal volume of about 1.5 cubic feet is sufficient, and because of the small amount of space that is available for positioning the bag inflation device, it is highly desirable to have a low gas temperature so that the gas entering the bag very shortly after combustion has little or no tendency to perforate the bag with hot fragments. A gas generator cartridge as provided in FIG. 13 has a large volume of gas, a relatively large proportion of noncondensable gases, i.e., relatively low quantity of water in the combustion products, and operates as quickly and reliably as the embodiments hereinabove described and illustrated.

The gas generator cartridge comprises a cylindrical cup-shaped housing 121, which is provided with threads 122 at its open end. A conventional initiator 123 is threaded into the opposite or closed end of the housing. In the embodiment illustrated in FIG. 13, the hermetic seal for the pyrotechnic mixture and the diffuser between the cartridge and the gas bag are not illustrated.

Packed within the housing 121 as a series of layers are gas generating compositions for generating substantial volumes of non-toxic gases, which in this instance comprise principally carbon dioxide, oxygen, and water vapor, plus some vaporized inorganic salt. The first layer 124 adjacent the initiator 123 comprises about one gram of pyrotechnic mixture which is preferably 80 percent potassium chlorate and 20 percent sucrose. It will be noted that this pyrotechnic mixture exceeds the stoichiometric proportion that would yield substantially entirely carbon dioxide and water vapor upon combustion, and because of the excess of the potassium chlorate there is also an appreciable quantity of oxygen arising from thermal decomposition of the potassium chlorate.

Adjacent the first layer is a second layer 126, which comprises about three grams of potassium chlorate. This layer and the others in the housing are preferably pressed in place with sufficient pressure to compact them and minimize any probability of disclocation of the powders during storage of the gas generator cartridge in an automobile prior to use. The next layer 127 on top of the potassium chlorate layer 126 comprises about one-half gram of the pyrotechnic mixture of 80 percent potassium chlorate, and 20 percent sucrose.

On top of this pyrotechnic mixture layer 127 is a layer 128 of hydrated magnesium carbonate. Typically there are about three grams of the hydrated magnesium carbonate where the degree of hydration is between 3 and 5. On top of the magnesium carbonate layer 128 is a ½ gram layer 129 of the aforementioned pyrotechnic mixture. Successive layers 130 and 131 are alternately three grams of potassium chlorate and one-half gram of the pyrotechnic mixture, respectively, until the gas generator cartridge has a total of about 24 grams of the gas generating compositions therein.

When the initiator 123 is actuated, the pyrotechnic mixture in the first layer 124 is ignited to generate a substantial volume of carbon dioxide and water vapor with a surplus of oxygen, which clearly inhibits any tendency to form toxic carbon monoxide. The heat of this reaction serves to decompose the potassium chlorate in the overlying layer 126. The decomposition reaction of potassium chlorate is actually slightly exothermic; however, it is believed that the net reaction of decomposition and heating the materials to elevated temperature may be endothermic. At any event, a rather large volume of oxygen is liberated from the potassium chlorate without any substantial increase in the caloric output of the gas generator, which would increase the temperature of the gas produced by the gas generator cartridge. As the reaction progresses in the gas generator cartridge, the successive layers 127, 129, and 131 of the pyrotechnic mixture are ignited, thereby producing additional heat and gas. A substantial portion of this heat is believed to be dissipated in the generation of oxygen from the potassium chlorate. In addition, decomposition of the hydrated magnesium carbonate to produce carbon dioxide and water vapor also absorbs a considerable quantity of heat due to the endothermic decomposition.

The result is that a rather large quantity of carbon dioxide, water vapor, and oxygen, plus some vaporized potassium chloride is generated at a sufficiently low temperature that it can be passed almost directly into a gas bag without any danger of perforation thereof. It should be apparent that the potassium chlorate serves in a manner analogous to the magnesium carbonate and other coolants in providing a substantial volume of non-toxic gas at relatively low temperature.

In a passenger restraint bag for the steering wheel of an automobile it is preferable after initial complete inflation to maintain the bag inflated to a somewhat greater extent than the bag at the passenger compartment, and yet maintain less than complete inflation. The gas generator cartridges described and illustrated in FIG. 13 is particularly advantageous for this purpose since a relatively high proportion of carbon dioxide and oxygen is produced, which is not condensable in the gas bag, and a lesser quantity of water vapor and vaporized potassium chloride are produced. The extent of deflation after full inflation is also minimized since the maximum temperature of the gases entering the gas bag is lower than in some other embodiments, and therefore less contraction of the hot gases results.

It is typically found that after the gas bag has been fully inflated and cooling has occurred to ambient temperature resulting in condensation of inorganic salts and water vapor, the noncondensable gas remaining in the bag keeps it approximately one half inflated, which is advantageous for providing some additional protection in case of a second impact as is often encountered in a complex automobile collision.

It has been found that it is preferable in some embodiments to provide successive alternating layers of gas generating pyrotechnic mixture and gas generating coolant, rather than providing a gas generating mixture in which the coolant is intimately admixed. Thus, for example, it has been found that an excess of potassium chlorate may be included in the pyrotechnic mixture so as to generate oxygen by decomposition thereof in addition to the carbon dioxide and water vapor produced by reaction between the potassium chlorate and the sucrose. In such an arrangement it is preferable to remain below about 95 percent potassium chlorate and 5 percent sucrose since if a higher proportion of potassium chlorate is employed there is difficulty in obtaining a sufficiently homogeneous mixture that combustion is not erratic. Therefore, by providing alternate layers or similar adjacent bodies of pyrotechnic mixture and potassium chlorate, the coolant effect is obtained whereby large quantities of oxygen are liberated without reaching excessive temperatures, and the rate of reaction in the pyrotechnic mixture can be maintained under control. If a composition having 95 percent by weight of potassium chlorate and 5 percent surcrose provides a sufficient quantity of gas, intermediate layers of oxygen producing material may be deleted.

In the embodiment illustrated in FIG. 13 a layer 128 of hydrated magnesium carbonate or similar endothermic coolant is provided in addition to the layers of potassium chlorate that are interspersed between the pyrotechnic mixture layers. Preferably this endothermic coolant is nearer the closed end of the housing so as to best mix with the reaction products and effect cooling. Empirically this appears to be better than arranging this endothermic coolant, which has a non-volatile product, adjacent the open end of the gas generator cartridge since undecomposed magnesium carbonate or magnesium oxide particles may be ejected when it is arranged in a position nearer the open end.

It will be apparent, of course, that larger or smaller quantities of oxidizer powder, endothermic coolant, and pyrotechnic mixture may be employed in the several layers, or that the relative thickness, or numbers, or locations of the layers can be changed to fit various operating parameters. By using more hydrated coolant and less potassium chlorate, a higher proportion of water vapor may be provided. It should also be clear that instead of pressing successive layers of the powders together within a gas generator cartridge, other loading techniques may be employed, such as, for example, pressed pellets of the various materials assembled in the cartridge, or flat blanks of powders that have been compacted in sheet form and stamped out.

Many other modifications and variations will be apparent to one skilled in the art. Thus, for example, in lieu of using potassium chlorate, potassium perchlorate, sodium chlorate, sodium perchlorate, and the like, may be employed as desired for the oxygen generating layers in the composition. Similarly, if desired, in lieu of using potassium chlorate layers, several layers of endothermic coolants, such as magnesium carbonate, zinc carbonate, hydrated magnesium carbonate, borax, and hydrated salts of metals having oxides stable in the presence of water may be used as separate bodies adjacent bodies of pyrotechnic mixture.

Substituting starch for sucrose has been found advantageous in the pyrotechnic mixture because the starch has a higher melting point than sucrose and forms less carbon monoxide upon combustion. Zinc carbonate may also be preferable to magnesium carbonate since some production of carbon monoxide may accompany decomposition of the magnesium carbonate and it is substantially completely absent in decomposition of zinc carbonate.

Although several embodiments of gas generator and pyrotechnic mixtures therefore have been described and illustrated herein, many modifications and variations will be apparent to one skilled in the art. Thus, other compositions may be employed for generating a gas free of toxic or noxious components at a sufficiently elevated temperature for inflating a gas bag, and subsequently deflating it upon condensation and contraction of the gas, while still maintaining the gas temperature sufficiently low that there is no harmful effect on the bag or the passenger restrained by it. Various modifications of the arrangements for controlling temperature, composition, and pressure/time distribution of the gases will also be apparent. In addition, one skilled in the art can readily devise additional embodiments of gas distribution structures for use in a gas generator constructed according to principles of this invention. It is, therefore, to be understood that within the scope of the amended claims, the invention may be practiced otherwise than as specifically described.

What is claimed is:

1. A bag inflation system comprising:
    gas generator means comprising a normally solid mixture for oxidation-reduction reaction upon ignition for producing principally water vapor, carbon dioxide and an inorganic salt at a sufficiently high temperature to be principally in a vapor state;
    means for initiating deflagration of the mixture in response to a signal;
    means for hermetically closing the gas generator means before initiation of deflagration and for freely releasing gas therefrom after initiation;
    an outlet having a cross-sectional area substantially larger than cross-sectional area of the gas generator means;
    means for distributing gas from the gas generator means to the outlet comprising:
        a chamber connected to the gas generator means;
        a sound baffling array of wires in the chamber, and;
        a diverging passage connected along one side of the chamber between the chamber and the outlet, and wherein the chamber comprises a plurality of openings communicating between the interior of the chamber and the passage, the aggregate cross-sectional area of the openings being of the same order of magnitude as the cross-sectional area of the gas generator, and wherein the diverging passage has a length several times its width in directions transverse to the direction of gas flow; and
    means for connecting a gas bag over the outlet.

2. A bag inflation system comprising:
    gas generator means comprising a normally solid mixture for oxidation-reduction reaction upon ignition for producing principally water vapor, carbon dioxide and an inorganic salt at a sufficiently high temperature to be principally in a vapor state;

means for initiating deflagration of the mixture in response to a signal;

means for hermetically closing the gas generator means before initiation of deflagration and for freely releasing gas therefrom after iniitiation;

a first outlet having a cross-sectional area of the same order of magnitude as the cross-sectional area of the outlet of the gas generator means;

a first gas flow region comprising a chamber between the gas generator means and the first outlet having an internal volume very much larger than the volume occupied by the mixture; an array of wires in the first gas flow region between the outlet of the gas generator and the first outlet;

a second outlet downstream from the first outlet having a cross-sectional area substantially larger than cross-sectional area of the gas generator means;

a second gas flow region between the second and first outlets having a gas flow cross-section larger than the cross-sectional area of the first outlet; and means for connecting a gas bag over the second outlet.

3. A bag inflation system comprising:

gas generator means comprising a normally solid mixture for oxidiation-reduction reaction upon ignition for producing principally water vapor, carbon dioxide and an inorganic salt at a sufficiently high temperature to be principally in a vapor state;

means for initiating deflagration of the mixture in response to a signal;

means for hermetically closing the gas generator means before initiation of deflagration and for freely releasing gas therefrom after initiation;

a system outlet having a cross-sectional area substantially larger than cross-sectional area of the outlet of the gas generator means;

means for connecting a gas bag over the outlet; and means for distributing gas from the gas generator means to the system outlet; and wherein the means for distributing comprises a chamber connected to the gas generator means and having an internal volume substantially larger than the volume occupied by the mixture, a gas flow passage from the chamber having a cross-sectional area in the same order as the cross-sectional area of the outlet of the gas generator means and an array of wires in the gas flow region between the outlet of the gas generator and the gas flow passage.

4. A bag inflation system as defined in claim 3 wherein the gas generator means comprises a cup shaped container for the mixture with the open end thereof connected to the chamber; and wherein the means for initiating deflagration comprises an electrical initiator in the closed end of the container.

5. A gas generator for an automobile passenger restraint system comprising:

a gas generator cartridge having a closed end and an open end;

a gas generating composition in the cartridge;

means at the closed end of the cartridge for igniting the gas generating composition;

a sound baffling array of wires in the flow path of gas from the gas generating composition for causing gas flow to follow a tortuous path;

a plurality of apertures downstream from the array of wires the aggregate cross-sectional area of the apertures being of the same order as the cross-sectional area of the open end of the cartridge; and a gas passage having a gradually increasing cross-sectional area between the apertures and an outlet over which an inflatable gas bag may be placed.

6. A gas generator as defined in claim 5 wherein the gas generating composition comprises a pyrotechnic deflagration mixture for generating a gas comprising principally carbon dioxide, water vapor and vaporized inorganic salt.

7. A gas generator for an automobile passenger restraint system comprising:

a gas generator cartridge having a closed end and an open end;

a gas generating composition in the cartridge;

means at the closed end of the cartridge for igniting the gas generating composition;

a sound baffling array of wires in the flow path of gas from the gas generating composition for causing gas flow to follow a tortuous path;

a plurality of apertures downstream from the array of wires;

a gas passage having a gradually increasing cross-sectional area between the apertures and an outlet over which an inflatable gas bag may be placed; and means for partially obstructing the gas flow passage between the apertures and the gas bag to have a cross-sectional area in the obstructed region of the same order of magnitude as the aggregate cross sectional area of the apertures.

8. A gas generator for an inflatable bag automobile passenger restraint system comprising:

a generally cylindrical chamber;

a gas generator cartridge connected to one end of the chamber;

a gas generating composition in the cartridge;

means for igniting the gas generating composition;

a sound baffling array of wires in the chamber;

a plurality of apertures along a side wall of the chamber;

a diverging passage having its relatively smaller inlet in fluid communication with the apertures; and means for connecting a gas bag over the relatively larger outlet of the diverging passage.

9. A system as defined in claim 8 wherein the aggregate cross sectional area of the apertures is substantially the same as the cross-sectional area of the gas generator cartridge.

10. A system as defined in claim 9 wherein the internal volume of the chamber is substantially larger than the internal volume of the gas generator cartridge.

11. A system as defined in claim 8 further comprising an air aspirator having an inlet in fluid communication with ambient air and an outlet adjacent the diverging passage for inducing flow of ambient air into the flow of gas produced by the gas generator.

* * * * *

UNITED STATES PATENT OFFICE
CERTIFICATE OF CORRECTION

Patent No. 3,773,351　　　　　　　Dated November 20, 1973

Inventor(s) Vincent O. Catanzarite

It is certified that error appears in the above-identified patent and that said Letters Patent are hereby corrected as shown below:

Assignee of record should be --Specialty Products Development Corporation--.

Abstract, line 11,　"relatively large outlet" should be --relatively large area outlet--.

Column 1, line 16,　"restrain" should be --restraint--;
　　　　　line 59,　"undesible" should be --undesirable--;

Column 2, line 25,　"restrain" should be --restraint--.

Column 4, line 56,　"interwined" should be --intertwined--.

Column 7, line 26,　"complete" should be --completed--.

Column 8, line 24,　"from the gas" should be --from the bag--;
　　　　　line 25,　"condesation" should be --condensation--;
　　　　　line 37,　"inihiting" should be --inhibiting--.

Column 9, line 13,　"witout" should be --without--;
　　　　　line 65,　"to pack pack tightly" should be --to pack tightly--.

Column 11, line 10,　"determine" should be --determined--;
　　　　　 line 42,　"bore 59" should be --body 59--.

Column 12, line 37,　"pyortechnic" should be --pyrotechnic--.

Column 17, line 62,　"disclocation" should be --dislocation--.

Column 20, line 42,　"iniitiation" should be --initiation--.

Column 21, line 5,　"iniitiation" should be --initiation--.

Signed and sealed this 6th day of August 1974.

(SEAL)
Attest:

McCOY M. GIBSON, JR.　　　　　　　C. MARSHALL DANN
Attesting Officer　　　　　　　　 Commissioner of Patents